Jan. 13, 1970    M. W. PAPP    3,489,042
TOOLHOLDER
Filed June 30, 1965    2 Sheets-Sheet 1

INVENTOR.
MICHAEL W. PAPP

INVENTOR.
MICHAEL W. PAPP

United States Patent Office 3,489,042
Patented Jan. 13, 1970

3,489,042
TOOLHOLDER
Michael W. Papp, Cleveland, Ohio, assignor to The Warner & Swasy Company, Cleveland, Ohio, a corporation of Ohio
Filed June 30, 1965, Ser. No. 468,477
Int. Cl. B23b 29/00
U.S. Cl. 82—36                4 Claims

ABSTRACT OF THE DISCLOSURE

The toolholder includes a tool support base which is detachably mounted on a rotatable turret of a machine tool. The turret has a groove which slidably receives a dovetail-shaped portion of the tool support base. The tool support base is fixed to the turret by a pair of wedging members forming a part of the dovetailed portion which when moved are cammed into frictional engagement between a part of the tool support base and the supporting surfaces of the turret defining a portion of the groove. The wedge members have threaded openings therethrough which receive a rod member which is oppositely threaded at opposite end portions. The oppositely threaded end portions of the rod threadably engage the threaded openings in the wedge members so that rotation of the rod produces simultaneous movement of the wedge members toward and away from one another depending upon the direction of the rotation of the rod to move them into and out of wedging engagement. The rod extends substantially parallel to the axis of the rotation of the turret and has tool receiving portions at each end which are engaged by a suitable tool, such as a wrench, to rotate the rod.

---

The present invention relates to a toolholder for use in association with a machine tool, and particularly to a toolholder to be secured to a tool-supporting surface of a machine tool turret which is rotatable about an axis to bring different tools supported on different tool-supporting surfaces thereof into machining position.

The principal object of the present invention is the provision of a new and improved toolholder having a securing means for securing the toolholder to a machine tool turret and which tool holder may be readily secured to the turret in the desired position and removed therefrom by an operator manipulating the securing means without problems of interference with parts of toolholders on adjacent surfaces of the turret.

Another object of the present invention is the provision of a new and improved toolholder having securing means for securing the toolholder to a rotatable turret and wherein the securing means includes a tool connection rotatable to operate the securing means and which is accessible from the end of the turret and wherein the axis of the tool connection is substantially parallel to the axis of the turret.

A further object of the present invention is the provision of a new and improved toolholder having securing means for securing the toolholder to a rotatable turret and wherein the securing means comprises at least one wedge-like gib member which is movable substantially parallel to the axis of rotation of the turret to effect a wedging engagement between a portion of the toolholder and the turret, and wherein the wedge-like gib member is moved into its wedging position by rotation of a tool connection which is rotatable about an axis substantially parallel to the axis of rotation of the turret and which is readily accessible from the end of the turret.

Still a further object of the present invention is the provision of a new and improved toolholder having a securing means comprising a pair of gib members which are movable toward and away from each other to effect a wedging engagement between a portion of the toolholder and a portion of a machine tool turret and to release the toolholder from the turret, and wherein the gib members are supported on a rod member having oppositely threaded portions cooperable with the gib members so that upon rotation of the rod member in one direction, the gib members move toward each other and upon rotation of the rod member in the opposite direction, the gib members move away from each other.

A still further object of the present invention is the provision of a new and improved tool holder to be secured to a tool-supporting surface of a machine tool turret, as noted in the next preceding paragraph, and wherein the gib members are supported for movement parallel to the axis of rotation of the turret so as to effect the wedging engagement between the turret and the toolholder and are prevented from rotating upon rotation of a tool connection which is rotatable about an axis parallel to the axis of rotation of the turret to effect movement of the gib members into and out of their wedging position.

Further objects and advantages of the present invention will be apparent to those skilled in the art to which it relates from the following detailed description of a preferred embodiment thereof made with reference to the accompanying drawings forming a part of this specification and in which.

Figure 1:
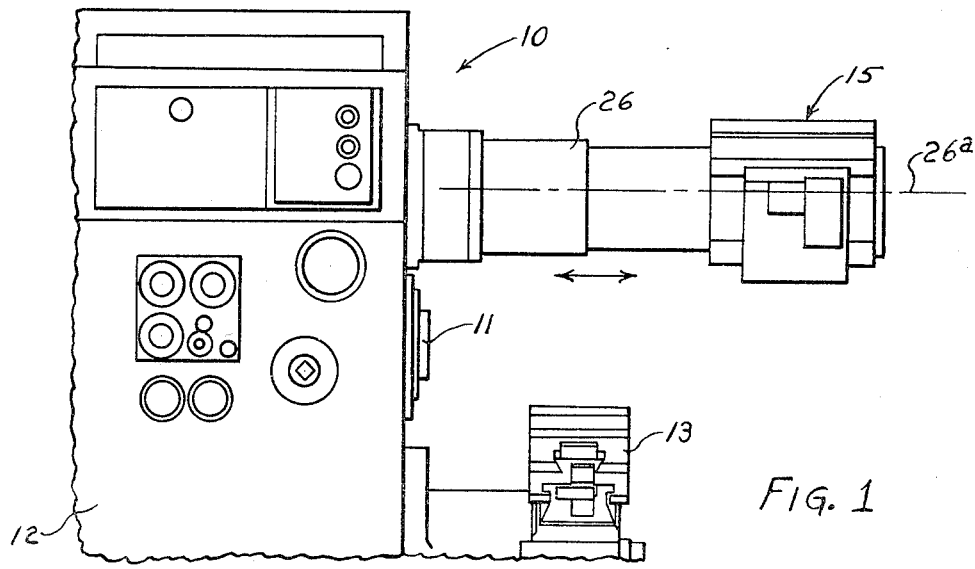
FIG. 1 is a schematic side elevational view of a machine tool in which the present invention may be embodied.

The present invention provides an improved toolholder to be secured to a tool-supporting surface of a machine tool turret and may be used with machine tool turrets of different constructions and embodied in different machine tool environments. The toolholder of the present invention may be readily secured to and removed from a tool-supporting surface of a turret of a machine tool without problems of interference and close clearances due to toolholders mounted on adjacent tool-supporting surfaces of the machine tool turret. The preferred toolholder of the present invention is shown in FIG. 1 as used in association with a machine tool 10.

The machine tool 10 includes a spindle 11 which is adapted to receive a workpiece and which is rotatable to rotate the workpiece. The spindle 11 is supported by a main frame 12 of the machine tool. A workpiece supported in the spindle 11 and rotatable therewith may be worked upon by tools carried by a cross-slide mechanism 13. The cross slide carries a cutting tool and is movable toward and away from the axis of rotation of the spindle to effect cutting of the workpiece carried in the spindle.

The machine tool 10 also includes a machine tool turret 15 having a plurality of tool-supporting surfaces 20–24, each of which is adapted to carry a toolholder for carrying a tool for engaging the workpiece. The turret 15 is supported on the outer end of a supporting beam structure 26. The supporting beam structure 26 is rotatable about an axis 26a in order to effect rotation of the turret 15 about the axis to present the different tools supported on the turret in machining position. Moreover, the supporting beam structure 26 is movable in the direction of the arrows shown in FIG. 1 to effect longitudinal movement of the turret 15 along its axis of rotation. The specific drive mechanism and detailed structure of the machine tool 10 are well known and will not be described in detail in view of this fact.

As noted above, a toolholder may be supported on each of the tool-supporting surfaces 20–24 of the turret 15, and each of the tool-supporting surfaces 20–24 of the turret 15 has a dovetail groove therein designated 30–34, respectively, to receive a portion of a toolholder to be supported thereon. The grooves 30–34 are identical in construction and only the groove 30 will be described herein in detail, it being understood that the others are of similar construction. The groove 30 is defined by a pair of side surfaces 30a and 30b which extend parallel to the axis of rotation 26a of the turret 15 and diverge as they extend inwardly of the turret. A bottom surface 30c interconnects the innermost portions of the surfaces 30a and 30b providing the bottom surface of the dovetail groove 30.

As noted above, the grooves 30–34 function to receive portions of the toolholders to be mounted on the turret. The toolholders to be mounted on the turret 15 may be of many different forms and carry different types of cutting tools. In the embodiment shown, three toolholders, designated 40, are shown mounted on the turret 15, namely, on the tool-supporting surfaces 21, 22 and 23 thereof. The construction of each of these toolholders and their manner of connection with the turret 15 are identical and, for purposes of this description, only the toolholder supported on the tool-supporting surface 21 will be described in detail, it being understood that the other tool-holders are secured in a similar manner to the turret 15.

The toolholder 40 supported on the tool-supporting surface 21 comprises a base portion 41 which includes a dovetail projecting portion 42 which is adapted to be received in the dovetail groove 31. The portion 42 of the toolholder base 41 which is received in the groove 31 has a surface 50 which is shaped to conform with the surface 31b of the groove 31, and when the toolholder is tightly secured to the turret, as will be described hereinbelow, the surface 50 of the portion 42 is in tight frictional engagement with the surface 31b of the groove 31. The surfaces 31b and 50, of course, extend parallel to each other and provide an area contact therebetween.

The projecting portion 42 of the toolholder base 41 also includes a surface portion 51, spaced from the surface 50 and extending generally axially of the turret. The surface 51 is comprised of three surface portions 51a, 51b, and 51c, best seen in FIG. 4. The surface portions 51a, 51c extend inwardly of the portion 42 from the opposite ends thereof and are interconnected by the surface 51b, and surface 51a and surface 51c extend away from the surface 50 as the surfaces 51a, 51c extend inwardly of the portion 42. The surfaces 51a and 51c comprise clamping surfaces, as will be described hereinbelow.

The toolholder 40 includes means for securing the toolholder 40 on the turret face 21 and, specifically, includes means for securing the portion 42 of the toolholder 40 in the groove 31. The securing means is broadly designated 60 in the drawings. The securing means 60 for securing the portion 42 of the toolholder in the groove 31 comprises a pair of wedge-like gib members 61, 62. The wedge-like gib members 61, 62 are movable between a wedging position in which they are wedged between portions of the toolholder and turret and secure the toolholder to the turret and a release position in which the toolholder may be moved relative to the turret for adjustment thereon or removed therefrom. In the release position, the gib members 61, 62 serve as a guide movement of the toolholder relative to the turret while located in the groove 31.

The gib member 61 is located at one end of the toolholder and the gib member 62 is located at the other end thereof spaced along the axis of rotation of the turret 15. The gib members are substantially identical in construction and, in view thereof, only one will be described, namely, the gib member 61.

The gib member 61 includes a surface 61a which lies in a plane containing the surface 42a of the portion 42 of the toolholder 40, which surface 42a extends adjacent the bottom surface 31c of the groove 31. The gib member 61 also includes a surface portion 61b which engages the surface 51a of the portion 42. The surface 61b of the gib member extends substantially parallel to the surface 51a and provides an area of contact therebetween. The gib member 61 also includes a surface 61c which extends parallel with the surface 31a of the groove 31 and when the gib member is moved into its wedging position, provides a surface area contact therebetween, as will be described hereinbelow. The surfaces 61b and 61c of course are non-parallel. The gib member 62 is constructed similar to the gib member 61 and has cooperating surface portions which cooperate with the surfaces 51c and 31a in the same manner as the surfaces of the gib member 61 described hereinabove.

The gib members 61 and 62 are movable toward and away from each other and when moved toward each other effect a tight clamping engagement of the portion 42 of the tool holder in the groove 31 of the turret. When the gib members are moved toward each other, the surfaces 61b, 62b thereof cooperate with the surfaces 51a, 51c, respectively, of the portion 42 of the toolholder to force the toolholder surface 50 into tight wedging engagement with the surface 31b of the turret. The surfaces 61c, 62c of the gib members 61, 62, respectively, tightly engage the surface 31a defining the groove 31. In this manner, the gib members 61, 62 wedgingly secure the toolholder to the turret. The gib members 61, 62 move away from each other when they move to their release position.

The gib members 61, 62 are movable toward and away from each other in the preferred embodiment by rotation of a member 70. The member 70 extends parallel to the axis of the turret and is rotatable about its own axis which is parallel to the axis 26a of the turret. The member 70 comprises a rod member having its opposite ends cooperating with the gib members 61, 62. The opposite ends of the rod member 70 are threaded, as designated at 71 and 72, and are threaded in an opposite manner and are received in threaded passages in the gib members 61, 62, respectively. The gib members 61, 62 are supported by the toolholder base 41 for nonrotation, as will be described hereinbelow. Thus, it should be clear that upon rotation of the member 70, the oppositely threaded end portions 71, 72, thereof cooperate with the threaded portions of the gib members 61, 62 to effect movement of the gib members 61, 62 in unison toward each other and away from each other, depending upon the direction of rotation of the member 70.

The member 70 may be rotated by a suitable tool, such as an Allen wrench, and the opposite ends of the member 70 are each provided with a suitable tool connection 73 therefore. The tool connection, of course, is formed integrally with the rod member 70 and is provided with a suitable opening 75 therein for receiving the wrench or other tool which is to be used for rotating the shaft member 70. The tool connections at the opposite ends of the rod 70 are accessible from the opposite ends of the turret 15, respectively, and intersect the outer axial end surfaces of the gib members 61, 62. As viewed in FIG. 4 only the left end of the rod 70 is shown as having a tool connection 73 connected therewith. The right end of the rod member 70 preferably also has a similar tool connection. Thus, the tool connections for the rod member 70 are accessible at opposite ends thereof and the rod member 70 may be rotated by an operator with an Allen wrench and is rotated from the opposite axial ends of the turret.

Figure 3:
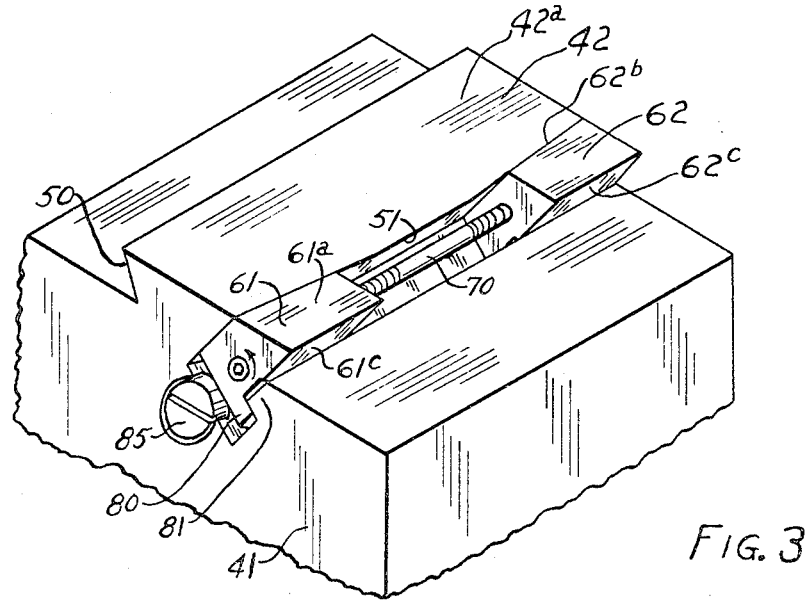
FIG. 3 is a perspective view illustrating a portion of a toolholder used in the machine tool of FIG. 1.

As noted hereinabove, the gib members 61, 62 are supported for nonrotation by the base 41 of the toolholder. The gib members each include a stop portion 80 which projects beneath a ledge portion 81 of the base 41, as viewed in FIG. 3. Rotation of the gib members 61, 62 in a counterclockiwse direction, as shown in FIG. 3, is prevented due, in part, to engagement of the stop portion 80 with the ledge portion 81. Rotation in a clockwise direction for the gib member 61 is prevented, due, in part, to the engagement of the surface 61b with surface 51a, and clockwise rotation of the gib member 62 is prevented by engagement of the corresponding surfaces for the gib member 62. Moreover, these engagements hold the gib members 61, 62 in assembled relation with the base of the toolholder, when the toolholder is not mounted in the turret.

The gib members 61, 62 are held from endwise or axial movement out of cooperative engagement with the member 70 by means of stop members. The stop members limit axial outward movement of the gib members 61, 62 and in the present embodiment comprise screw elements 85, 86 respectively. The screw element 85 is screwed into the base of the toolholder and has a head portion which engages a lip or ledge portion 87 of the gib 61, best seen in FIG. 2. The screw member 86 likewise has a head portion which engages a ledge portion or lip 87 of the gib member 62 to hold the gib member 62 from axial movement from the base 41. The gib members 61, 62 may not move in unison at all times and one gib member may stick in wedging position while the other moves therefrom. In the event one of the gib members 61, 62 sticks in wedging position, the shaft 70 may move relative to the sticking gib member, and the other gib may move out of wedging position, the gib member which moves out of wedging position engages the screw element 85, or 86, depending on which gib member moves, and will be stopped from further movement thereby and then the other gib member will be broken loose from its wedging position.

Figure 2:
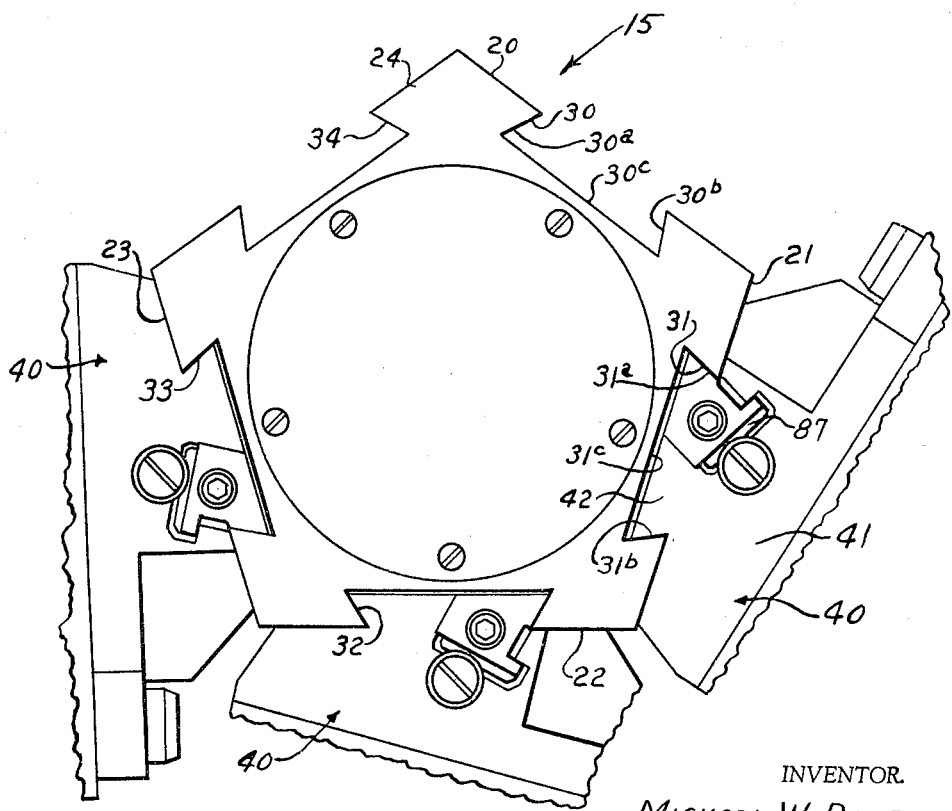
FIG. 2 is a fragmentary view of the machine tool shown in FIG. 1, looking at a portion of the machine tool shown in FIG. 1 from the right.
Figure 4:
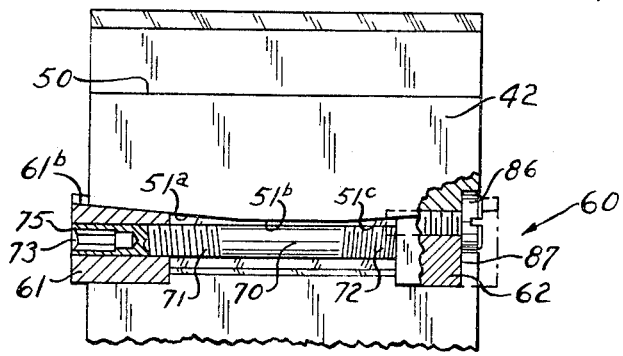
FIG. 4 is a fragmentary sectional view of a portion of the toolholder shown in FIG. 3.
Figure 5:
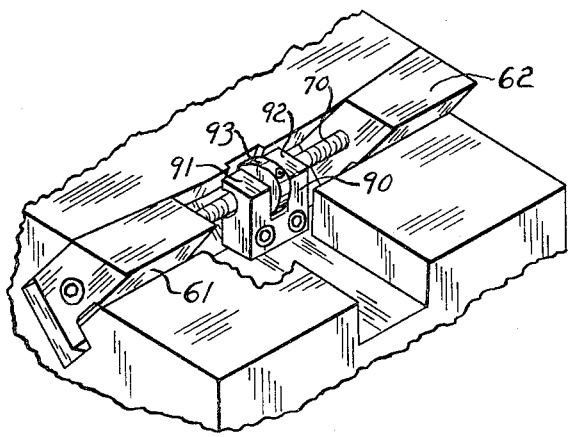
FIG. 5 is a fragmentary perspective view of a modified toolholder for use in the machine tool of FIG. 1.

The modification illustrated in FIG. 5 is similar to that disclosed in FIGS. 2–4 but differs therefrom in that the toolholder in FIG. 5 includes a central bracket member 90. The central bracket member 90 comprises a U-shaped member secured to the toolholder base and which includes leg portions 91 and 92 which are spaced apart and through which the shaft member 70 extends and which is rotatable relative to the leg portions 91 and 92. A collar member 93 is fixedly secured to the shaft 70 and is positioned between the leg portions 91 and 92 of the bracket 90. The collar member 93, as shown in FIG. 5, functions to limit movement of the shaft 70 in a direction parallel to its length by engagement with the legs 91 and 92.

From the above description, it should be readily apparent that applicant has provided a new and improved toolholder for a machine tool wherein the toolholder may be readily clamped to the turret of the machine tool and may be readily removed therefrom. Moreover, it should be apparent that certain modifications, changes, and adaptations may be made therein by those skilled in the art to which it relates and it is hereby intended to cover all such modifications, changes, and adaptations therein which come within the scope of the appended claims.

Having described my invention, I claim:

1. A toolholder to be secured in a groove in a rotatable machine tool turret comprising a tool base having a portion received in the groove in said turret, a pair of wedge members carried by said tool base and each movable relative thereto from a first non-wedging position wherein said tool base may be moved relative to said turret to a second wedging position wherein said wedge members are wedged between surfaces defining portions of said groove and said portion of said tool base, means for moving said wedge members between said positions including a rotatable member extending parallel to the axis of rotation of said turret and being operatively connected to said wedge members, and stop means for limiting axial movement of said rotatable member including a part connected to said rotatable member intermediate said wedge members and a cooperating part on said tool base whereby axial movement of said rotatable member is stopped when said parts engage.

2. A toolholder as defined in claim 1 wherein one of said parts includes spaced stop members and the other of said parts includes a stop member disposed between said pair of stop members of said one part.

3. A toolholder to be secured in a groove in a rotatable machine tool turret comprising a tool base having a portion received in the groove in said turret, a pair of wedge members carried by said tool base and each movable relative thereto from a first nonwedging position wherein said tool base may be moved relative to said turret to a second wedging position wherein said wedge members are wedged between a surface defining said groove and said portion of said tool base securing said portion in said groove, means for moving said wedge members between their positions including a rotatable member extending parallel to the axis of rotation of said turret and having a pair of rotatable tool connections at the opposite axial ends thereof and accessible from the opposite axial ends of the turret and each of said tool connections having a portion adapted to cooperate with a tool to effect rotation thereof, and stop means for limiting the extent of axial movement of said rotatable member including a part secured to said rotatable member intermediate said wedge members and a cooperating part secured to said base whereby axial movement of said rotatable member is stopped when said parts engage.

4. A toolholder to be secured in a groove in a rotatable machine tool turret comprising a tool base having a portion received in the groove in said turret, a pair of wedge members carried by said tool base and movable relative to said tool base from a first nonwedging position wherein said tool base may be moved relative to said turret to a second wedging position wherein said wedge members are wedged between surface portions defining said groove and surface portions on said tool base, the surface portions between which the wedge members are wedged when in wedging position being in a nonparallel relation, means holding said wedge members from rotation relative to said tool base, said means holding said wedge members from rotation relative to said tool base including a projecting ledge portion of said tool base cooperable with a stop portion of said wedge members to prevent rotation thereof in one direction and a surface portion of said tool base which engages a surface of said wedge members to prevent rotation in the opposite direction, a rotatable member extending parallel to the axis of rotation of said turret and having oppositely threaded end portions received in cooperating threaded openings in said wedge members and rotatable relative to said wedge members, the opposite ends of said rotatable member each including a rotatable tool connection accessible from the opposite remote axial ends of the wedge members and having a portion adapted to cooperate with a tool to effect rotation of said rotatable member to effect movement of said wedge members toward and away from each other in unison depending upon the direction of rotation thereof, and means for limiting axial movement of said wedge members away from each other including screw members threaded into said base and having head portions engageable with a portion of said wedge members when said wedge members are moved to a predetermined position.

(References on following page)

References Cited

UNITED STATES PATENTS

| | | | |
|---|---|---|---|
| 1,526,575 | 2/1925 | Wood | 82—31 |
| 652,860 | 7/1900 | Perrin | 82—36 X |
| 946,924 | 1/1910 | Thompson | 82—36 X |
| 991,675 | 5/1911 | Vold | 82—31 |
| 2,637,237 | 5/1953 | Montgomery | 82—36 X |
| 2,927,612 | 3/1960 | Edgemond et al. | 82—31 X |

LEONIDAS VLACHOS, Primary Examiner

U.S. Cl. X.R.

82—37